United States Patent [19]
Gilbert et al.

[11] Patent Number: 5,906,354
[45] Date of Patent: May 25, 1999

[54] BALL VALVE FOR LETHAL GAS OR FLUID SERVICE

[75] Inventors: Gregory N. Gilbert, Missouri City, Tex.; Curry B. Walker, Sulphur, La.

[73] Assignee: Sigma Scientific Technology, Inc., Houston, Tex.

[21] Appl. No.: 09/005,933

[22] Filed: Jan. 12, 1998

[51] Int. Cl.⁶ .............................. F16K 41/04; F16J 15/24
[52] U.S. Cl. ............... 251/214; 277/523; 251/315.14
[58] Field of Search ................... 251/214, 264, 251/265, 266, 267, 268, 269, 330, 315.01, 315.11, 315.16, 315.14; 277/511, 520, 522, 523

[56] References Cited

U.S. PATENT DOCUMENTS

| | | | |
|---|---|---|---|
| 3,151,837 | 10/1964 | Bentley-Leek | 251/214 |
| 3,216,697 | 11/1965 | Holmberg | 251/214 |
| 3,218,024 | 11/1965 | Kroekel | 251/58 |
| 3,257,095 | 6/1966 | Siver | 251/330 |
| 3,371,676 | 3/1968 | Mullaney, III | 251/214 |
| 3,425,663 | 2/1969 | Priese | 251/214 |
| 3,586,289 | 6/1971 | Priese | 251/214 |
| 3,787,060 | 1/1974 | Astill et al. | 251/214 |
| 4,773,442 | 9/1988 | Lephilibert | 251/214 |
| 5,192,049 | 3/1993 | Ridge | 277/523 |
| 5,407,176 | 4/1995 | Nevrekar | 251/214 |
| 5,531,244 | 7/1996 | Siver | 251/214 |

OTHER PUBLICATIONS

McCannaseal® Ball Valves Brochure, Feb. 1997, pp. 1–24.

*Primary Examiner*—George L. Walton

[57] ABSTRACT

An improved ball valve for lethal gas or fluid service is disclosed having a novel triple redundant stem to bonnet seal design. A ceramic seal ring forms the primary stem to bonnet seal. The ceramic seal ring has a first seal surface lapped for sealing engagement with a corresponding lapped surface on the stem and a second seal surface lapped for sealing engagement with a corresponding lapped surface on the bonnet. The ceramic seal ring first seal surface lapped for sealing engagement with a corresponding lapped surface on said stem and the corresponding lapped surface on the stem may be frustoconically or spherically shaped. An elastomeric seal and a compression type seal between the stem and bonnet act as redundant seals. A preloading means to maintain the ceramic seal ring and lapped sealing surfaces on the bonnet and stem in sealing engagement is shown.

33 Claims, 8 Drawing Sheets

BALL VALVE FOR LETHAL GAS OR FLUID SERVICE

BACKGROUND OF THE INVENTION

1. Field of the Invention

This invention relates to an improved ball valve used in lethal gas or fluid service. Valves of this type are used in handling toxic gases such as phosgene used in the petrochemical industry.

Phosgene and similar toxic gases used in industrial applications must be handled with extreme caution as a concentration of as little as 50 parts per million can cause death in a matter of minutes. Typical valves used in this type of service include a body with a through bore with a ball positioned in the valve body bore. The ball has a through bore and controls fluid flow between the inlet connection and the outlet connection of the finished valve. A pair of seal elements commonly referred to as "seats" are located on each side of the ball and form a seal between the ball and valve body. Each seat has a spherical surface to seal against the ball's spherical outer surface. The seats in turn seal against the valve body with elastomeric seal elements or by grinding a sufficiently fine finish on the seat and corresponding valve body surface to effect a seal. Usually some type of preloading means such as a spring or belleville washer is used to initially preload the seal between the ball and the seats.

The opening and closing of the valve are controlled by a stem that engages a slot machined in the ball. The stem extends through a port machined in the valve body that is generally perpendicular to the valve bore. This port is sealed by a sleeve referred to as a "bonnet" that typically is bolted to the valve body. The stem is rotatable within the bonnet to open and close the valve. The annular space between the stem and bonnet is usually sealed with an elastomeric or advanced polymer plastic material. This seal element must be impervious to the lethal gas or fluid being handled while having sufficient elasticity to reliably seal between the stem and bonnet. Typical valves to date have relied upon a pair of seal elements with a monitoring port above the first seal element to detect when this seal element has deteriorated to the point where it no longer can seal between the stem and bonnet and contain the lethal gas or fluid. It is the type of valve that must reliably seal these legal gases or fluids to which the present invention is directed.

Additionally, the typical valve available to date has offered only advanced polymer plastic material seals, referred to as "polymerics" in the industry, for this critical stem to bonnet seal. When a seal begins leaking and the valve then becomes unreliable and unsafe, the solution has been to stop production while a new valve is installed. This results in lost production and a concomitant loss of revenue. The improved ball valve for use in lethal gas or fluid service of the current invention offers a substantial improvement by offering a reliable valve with a ceramic primary seal and redundant seals to ensure long service.

2. Description of Related Art

No valve offering the features of the improved ball valve of the present invention has been found.

SUMMARY OF THE INVENTION

The improved ball valve for lethal gas or fluid service of the current invention includes a body having an inlet connection and an outlet connection in fluid communication with a central bore. A ball with a through bore is positioned in the bore of the valve body to control fluid flow between the inlet connection and the outlet connection. A pair of seats is located on each side of the ball. The seat adjacent the outlet connection has a spherical surface lapped for sealing engagement with a corresponding lapped spherical surface on the ball and a circular surface lapped for sealing engagement with a corresponding lapped surface on the body. A belleville spring is positioned between the seat adjacent the inlet connection and the body to urge the lapped surfaces on the seat and the ball and body into sealing engagement.

A bonnet is sealingly connected to the valve body with a stem engaging the ball and rotatable within the bonnet to move the ball between the open and closed positions. A seal ring is positioned between the stem and the bonnet. This seal ring may be made of ceramic material, high alloy metal or high alloy metal with an abrasion resistant coating. The seal ring has a first seal surface lapped for sealing engagement with a corresponding lapped surface on the stem and a second seal surface lapped for sealing engagement with a corresponding lapped surface on the bonnet. The seal ring's seal surface lapped for sealing engagement with a corresponding lapped surface on the stem and the corresponding lapped surface on the stem may be frustoconically or spherically shaped. A pair of seals between the stem and bonnet act as redundant seals should the seal ring begin leaking. The upper polymeric seal is preloaded by belleville springs acting on a packing follower with a spherical upper face to allow misalignment between the packing follower and the stem.

A preloading means to maintain the seal ring and lapped sealing surfaces on the bonnet and stem in sealing engagement includes a preloading bolt having a threaded lower portion and an upper flanged portion. The threaded lower portion is threaded into the stem while the upper flanged portion fits in a stem adapter. The stem adapter fits about the stem and is mounted on a pair of support plates that is in turn mounted on the valve body exterior. A plurality of belleville spring washers positioned between the preloading bolt and the stem adapter allows rotation of the preloading bolt to compress the belleville spring washers and preload the stem to maintain the seal ring and lapped sealing surfaces on the bonnet and stem in sealing engagement.

A principal object of the present invention is to provide an improved ball valve for lethal gas or fluid service that provides redundant seals between the stem and bonnet.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENT

Figure 1:
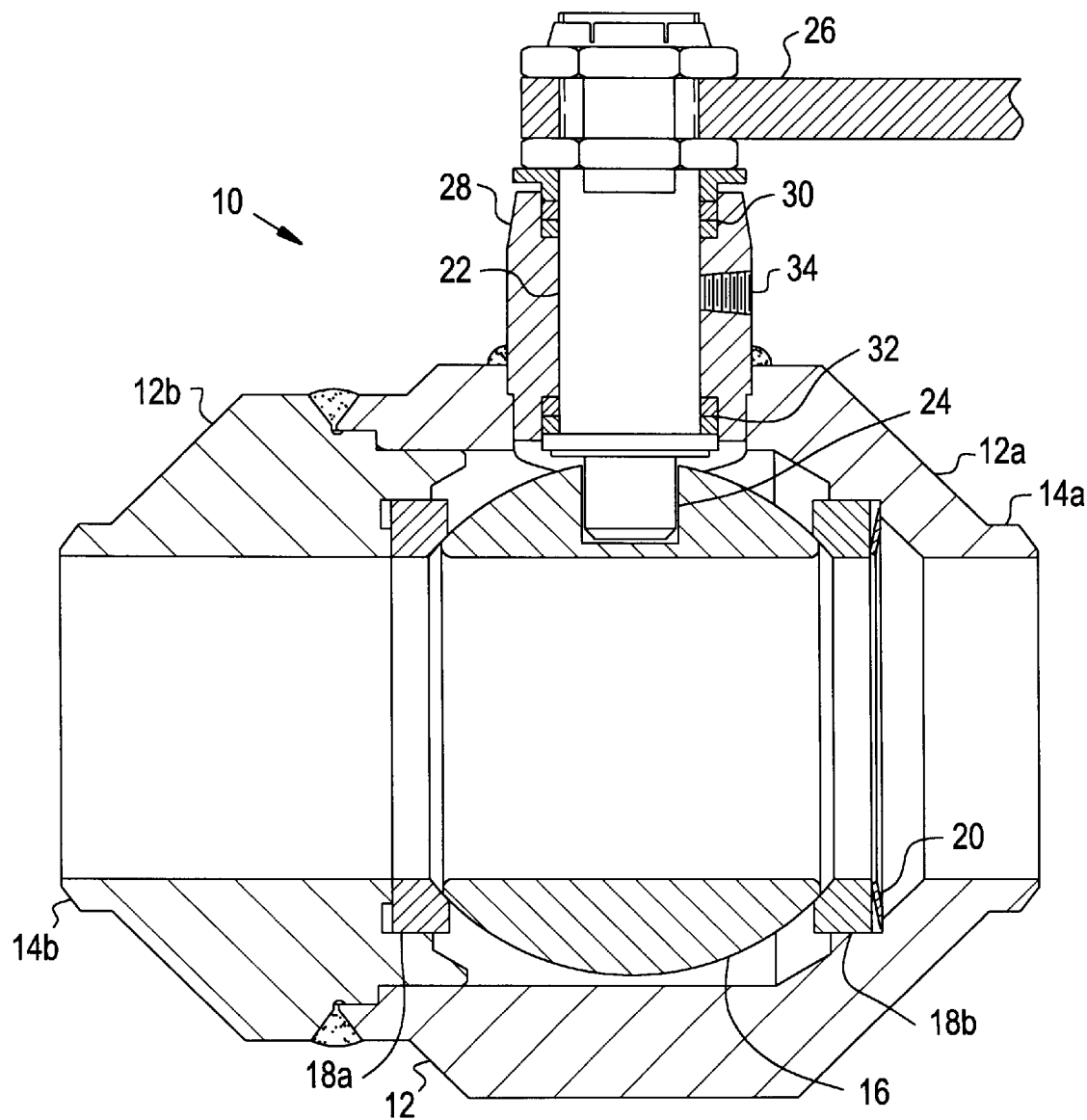
FIG. 1 is a sectional of a prior art ball valve typically used in lethal gas or fluid service.

With reference to the drawings, and particularly to FIG. 1, a sectional view of a prior art ball valve 10 used in lethal gas or fluid service is shown. The ball valve 10 includes a welded body 12 composed of main body 12a and end cap 12b. Butt weld preparations 14a and 14b are located on main body 12a and end cap 12b, respectively, to allow valve 10 to be welded into a flowline. Ball 16 is centrally located within welded body 12 with seat 18a and push ring 18b positioned on either side. Ball valve 10 is a unidirectional design with the flow directed as shown. Belleville spring 20 is positioned between push ring 18b and main body 12a to preload seat 18a into sealing engagement with ball 16. Stem 22 has a milled end 24 that engages the top of ball 16 to allow rotation of ball 16 and thereby open and close valve 10. Handle 26 is attached to the top of stem 22 to allow rotation of stem 22 and ball 16. Bonnet 28 surrounds stem 22 and is welded to main body 12a. Upper stem packing 30 and lower stem packing 32 seal the annulus between stem 22 and bonnet 28. A pressure monitoring port 34 allows an operator to monitor the annulus between stem 22 and bonnet 28. If lethal gas or fluid within the valve body 12 leaks past lower stem packing 32, it will be contained by upper stem packing 30 where it can be detected at pressure monitoring port 34. This gives the operator the opportunity to replace valve 10 before the lethal gas or fluid can leak past upper stem packing 30 and endanger people close to the valve 10. The rotational and corresponding side loads on stem 22 are transmitted to lower stem packing 32. Any downward or side load transmitted to packing 32 can possibly unseat packing 32 and allow leakage. Additionally, these loads cause excessive wear on lower stem packing 32 that results in premature failure of lower stem packing 32. This shortens the useful life of valve 10 and causes increased expense and lost production for the operator.

Figure 2:
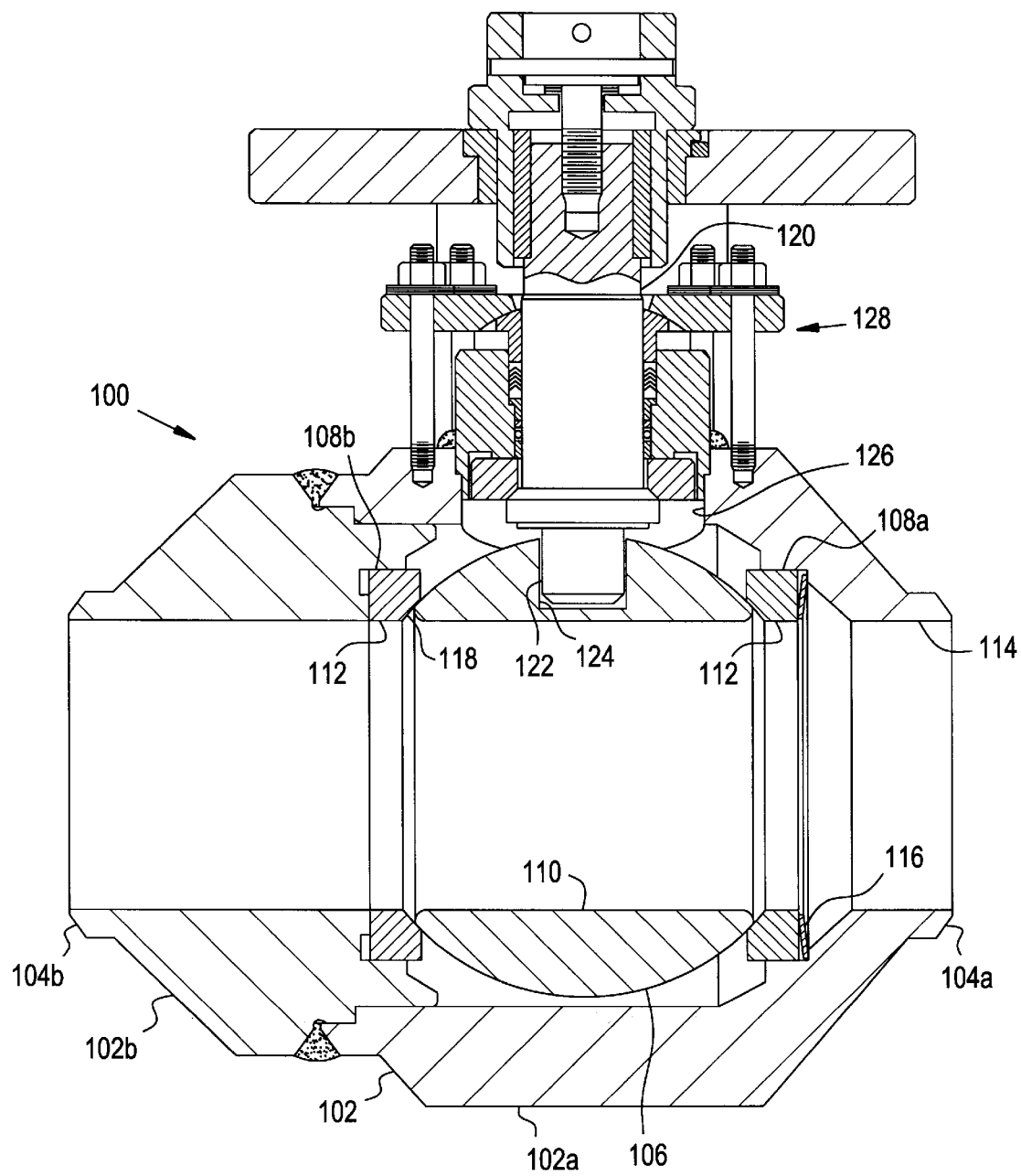
FIG. 2 is a sectional view of the improved ball valve for lethal gas or fluid service of the present invention.

FIG. 2 is a sectional view of the improved ball valve 100 of the present invention. The ball valve 100 includes a welded body 102 composed of main body 102a and end cap 102b. Butt weld preparations 104a and 104b are located on main body 102a and end cap 102b, respectively, to allow valve 100 to be welded into a pipeline. Although shown with butt weld preparations 104a and 104b these end connections should be considered exemplary and not limiting as ball valve 100 can be configured with other end connections well known to those of skill in the art such as flanged end connections or studded end connections.

Ball 106 is positioned within welded body 102 with push ring 108a and seat 108b positioned on either side. Ball 106 has bore 110 therethrough. Similarly, push ring 108a and seat 108b have bores 112 therethrough that are shown equal to bore 114 of welded body 102 to give a continuous bore through valve 100 when ball 106 is in the open position. As is well known to those of ordinary skill in the art, ball 106 may be manufactured with bore 110 reduced from that of body 102 without departing from the scope of the present invention. Belleville spring 116 is positioned between push ring 108a and main body 102a to preload seat 108b into sealing engagement with ball 106. Sealing between seat 108b and ball 106 is accomplished by spherical seal surface 118 on seat 108b that is mate lapped to the exterior of ball 106 to effect a seal. In the preferred embodiment shown, ball 106, push ring 108a and seat 108b are made of partially stabilized zirconia ("PSZ") ceramic. The material of ball 106, push ring 108a and seat 108b may be made of other suitable materials such as high alloy metals or high alloy metals with an abrasion resistant coating well known to those of ordinary skill in the art without departing from the scope of the invention. The position of ball 106, i.e., either open or closed is controlled by stem 120. Stem 120 has a milled end 122 that engages a recess 124 in ball 106. Rotation of stem 120 controls the opening and closing of ball 106.

Figure 3:
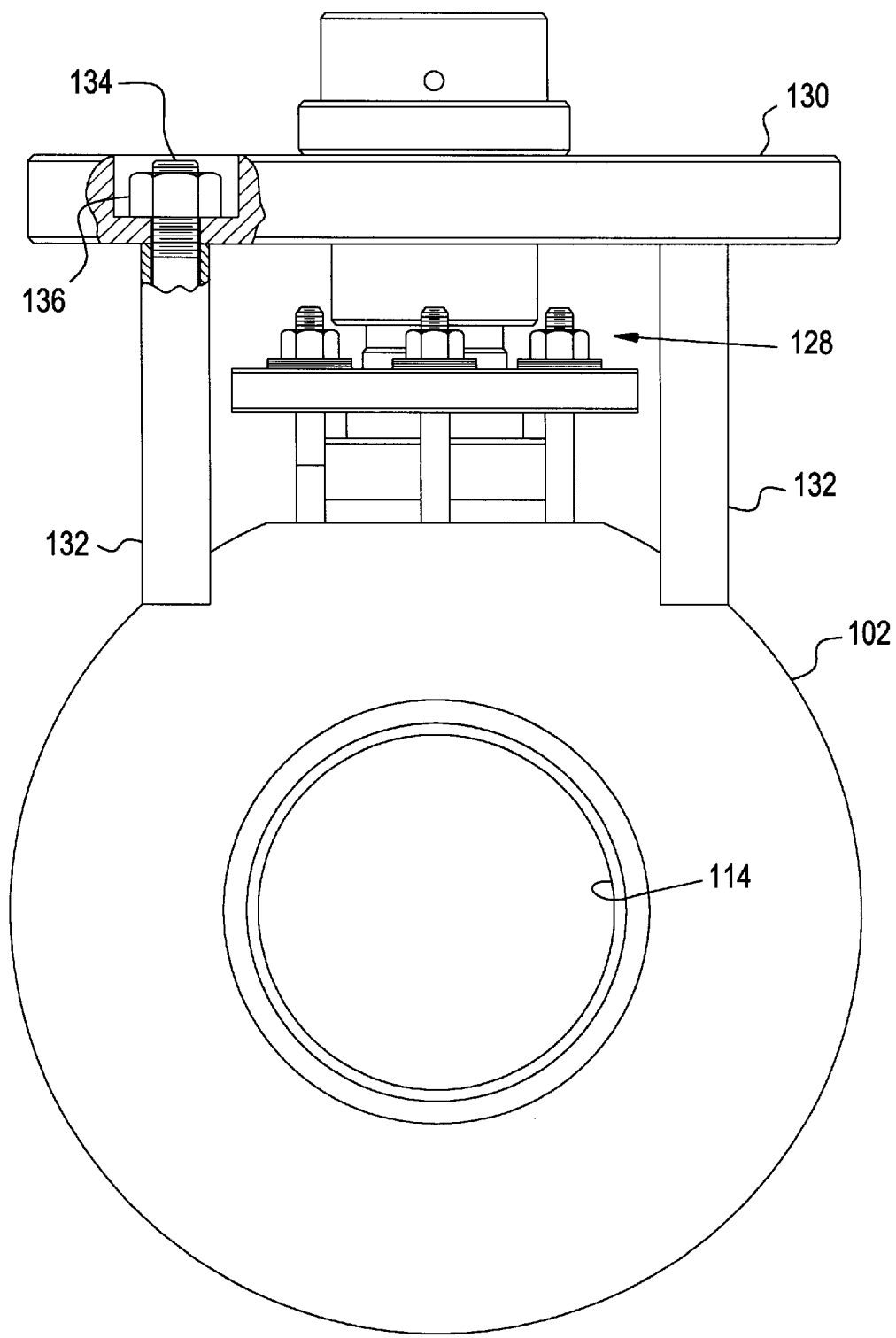
FIG. 3 is an end view of the improved ball valve of FIG. 2.

Main body 102a includes access port 126 into which bonnet assembly 128 is shown welded to produce a gas tight seal, although it could be a bolted connection as is well known to those of ordinary skill in the art. As best seen in FIG. 3, bonnet assembly 128 is supported on mounting flange 130 that is supported on mounting legs 132. Mounting legs 132 are rigidly secured to valve body 102a by studs 134 and nuts 136. Mounting legs 132 and mounting flange 130 act together to maintain stem 120 and bonnet assembly 128 in gas tight sealing engagement in a manner to be described hereinafter.

Figure 4:
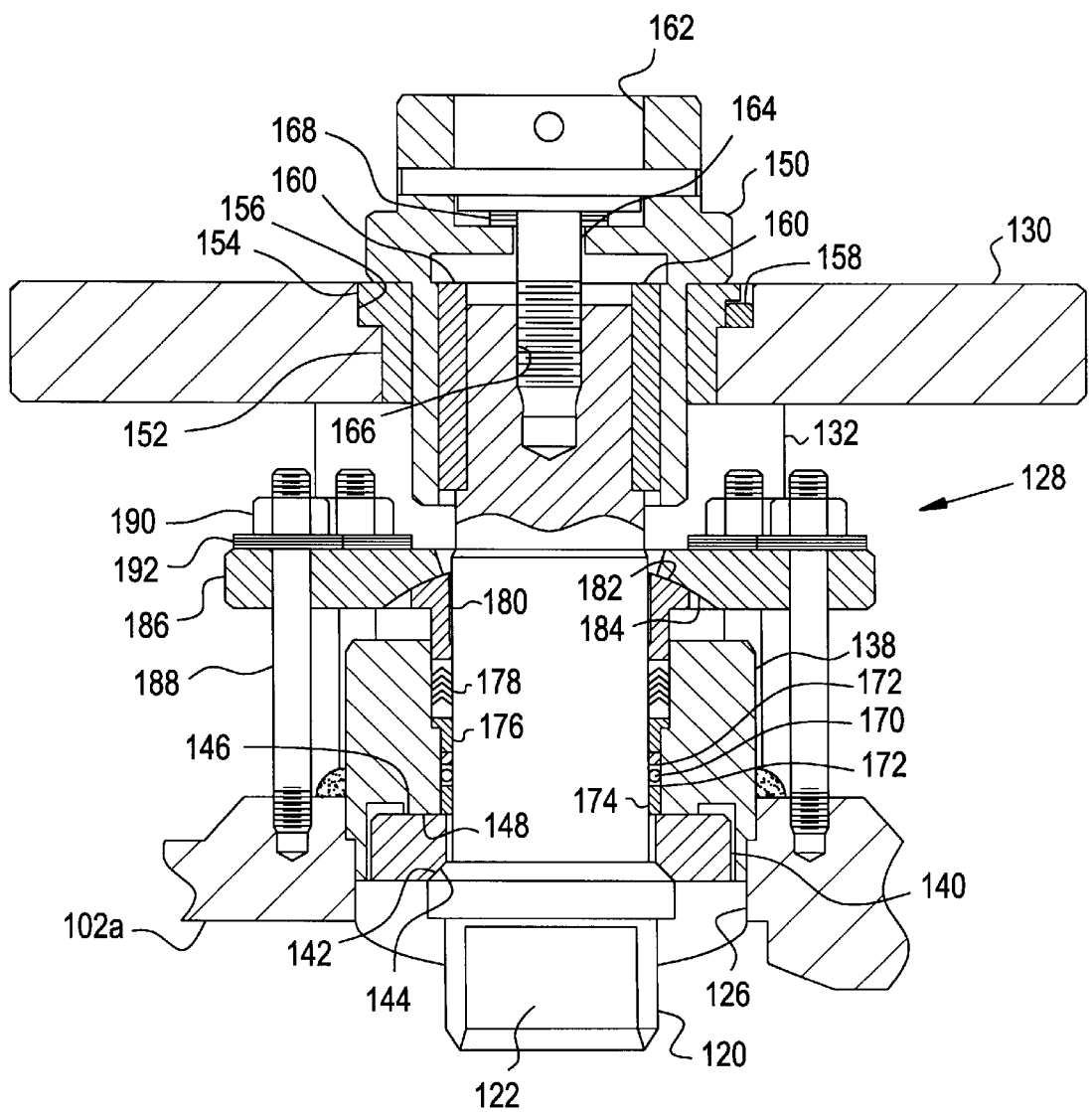
FIG. 4 is a partial sectional view of the improved ball valve of FIG. 2 showing the bonnet and stem seal details with a spherically shaped stem.

The details of stem 120, bonnet assembly 128, and mounting flange 130 are best seen in FIG. 4. Bonnet assembly 128 includes bonnet body 138 secured by welding to main body 102a. Bonnet body 138 is a generally cylindrical member encircling stem 120. The annular space between bonnet body 138 and stem 120 has three seals to ensure any lethal gas or fluid contained within valve 100 cannot leak to the outside. The first seal is ceramic seal ring 140 that seals against outwardly facing shoulder 142 on stem 120. Seal ring 140 may be made of other suitable materials such as high alloy metals, high alloy metals with an abrasion resistant coating or polymeric materials well known to those of ordinary skill in the art without departing from the scope of the invention. Seal shoulder 144 of ceramic seal ring 140 is spherically shaped and lapped to form a gas tight seal against mating shoulder 142 of stem 120 that is also spherical with a lapped finish. The sealing of the annulus between bonnet body 138 and stem 120 is completed by a similar lapped seal between ceramic seal ring 140 and bonnet body 138. Upper face 146 of ceramic seal ring 140 is lapped to seal against matching lapped lower face 148 of bonnet body 138. These two seals ensure a safe, effective seal that is durable due to the use of ceramic seal ring 140.

Sufficient contact force between stem 120, bonnet body 138 and ceramic seal ring 140 to ensure a positive seal under all operating conditions is maintained in the following manner. Stem 120 is surmounted by stem adapter 150 that is contained within guide bushing 152. Guide bushing 152 is an annularly shaped ring with flange 154 that fits within recess 156 of mounting flange 130. Anti-rotation pin 158 prevents rotation of guide bushing 152 within mounting flange 130 that is rigidly secured to mounting legs 132 and valve body 102a by studs 134 and nuts 136 as previously described. Stem adapter 150 is rotatable within guide bushing 152 with square keys 160 transmitting this torque to stem 120. Stem adapter 150 includes a recess 162 in its upper face that receives loading bolt 164. Stem adapter 150 may have a handwheel or actuator attached as is well known to those of ordinary skill in the art to control the rotation of stem adapter 150 and hence stem 120 and ball 106. Loading bolt 164 engages threads 166 in the upper face of stem 120. Belleville springs 168 are placed between loading bolt 164 and recess 162. As loading bolt 164 is threaded into threads 166 of stem 120, belleville springs 168 are compressed and thereby urging stem 120 upwardly. The upward motion of stem 120 is stopped by the contact between outwardly facing shoulder 142 of stem 120 engaging seal shoulder 144 of ceramic seal ring 140 and upper face 146 of ceramic seal ring 140 engaging lapped lower face 148 of bonnet body 138. Thus the compression of belleville springs 168 is used to preload the ceramic seal ring 140 between stem 120 and bonnet body 138.

As noted earlier, the annular space between bonnet body 138 and stem 120 has three seals to ensure any lethal gas or fluid contained within valve 100 cannot leak to the outside. Besides the preloaded ceramic seal ring 140 described above, two seals are used. The first of these is elastomeric "O" ring 170 with a backup ring 172 on either side of "O" ring 170. A lower spacer ring 174 rests on ceramic seal ring 140 to locate "O" ring 170 and backup rings 172 above ceramic seal ring 140. Upper spacer ring 176 is positioned immediately above "O" ring 170 and backup rings 172. Chevron type packing 178 sits on upper spacer ring 176. Packing follower 180 in turn sits on chevron packing 178. Packing follower 180 has a spherical upper face 182 that coacts with a mating spherical lower face 184 on gland flange 186. Gland flange 186 is secured to main body 102a by studs 188 and nuts 190. Urging means such as belleville springs 192 are positioned on studs 188 to exert a preload force through packing follower 180 and gland flange 186 to chevron type packing 178 when nuts 190 are tightened while upper spacer ring 176 prevents axial loading of "O" ring 170 and backup rings 172 when nuts 190 are tightened.

The rigid connection of mounting flange 130 and mounting legs 132 to valve body 102a and stem adapter 150 act together to isolate stem 120 from downward or side loading. This is important since any impact load on stem 120 could unseat stem 120 from ceramic seal ring 140. Additionally, should any side load be transmitted to stem 120 the spherical shoulder on stem 120 allows lateral articulation while maintaining a seal with ceramic seal ring 140.

Figure 5:
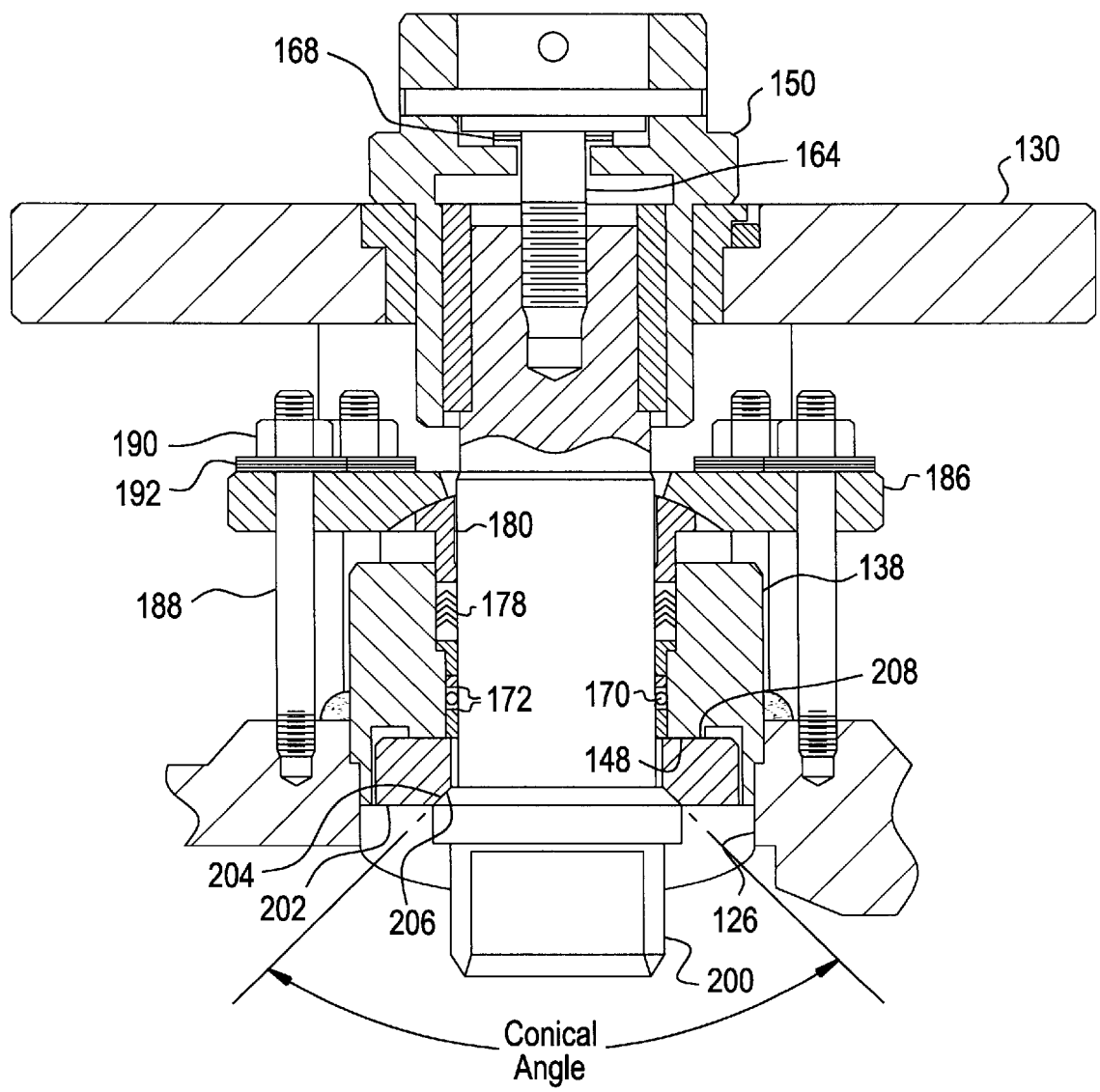
FIG. 5 is a partial sectional view of an improved ball valve of FIG. 2 showing the bonnet and stem seal details with a frustonconically shaped stem.

An alternate embodiment of the primary ceramic seal ring between the stem and bonnet is shown in FIG. 5. Those items that are identical to those in the preferred embodiment of FIGS. 2–4 retain their original numerical designation. As in the preferred embodiment, stem 200 is positioned within bonnet 138. Ceramic seal ring 202 seals the annular space between bonnet body 138 and stem 200. As in the preferred embodiment, "O" ring 170, backup rings 172 and chevron type packing 178 function as redundant seals to ensure any lethal gas or fluid contained within valve 100 cannot leak to the outside. Ceramic seal ring 202 seals against outwardly facing shoulder 204 on stem 200. Seal shoulder 206 of ceramic seal ring 202 is frustoconically shaped and lapped to form a gas tight seal against mating shoulder 204 of stem 200 that is also frustoconically shaped with a lapped finish. The sealing of the annulus between bonnet body 138 and stem 200 is completed by a similar lapped seal between ceramic seal ring 202 and bonnet body 138. Upper face 208 of ceramic seal ring 202 is lapped to seal against matching lapped lower face 148 of bonnet body 138. These two seals ensure a safe, effective seal that is durable due to the use of ceramic seal ring 202. Sufficient contact force between bonnet body 138, stem 200 and ceramic seal ring 202 to ensure a gas tight seal is maintained by loading bolt 164 and belleville springs 168 as in the preferred embodiment.

Figure 6:
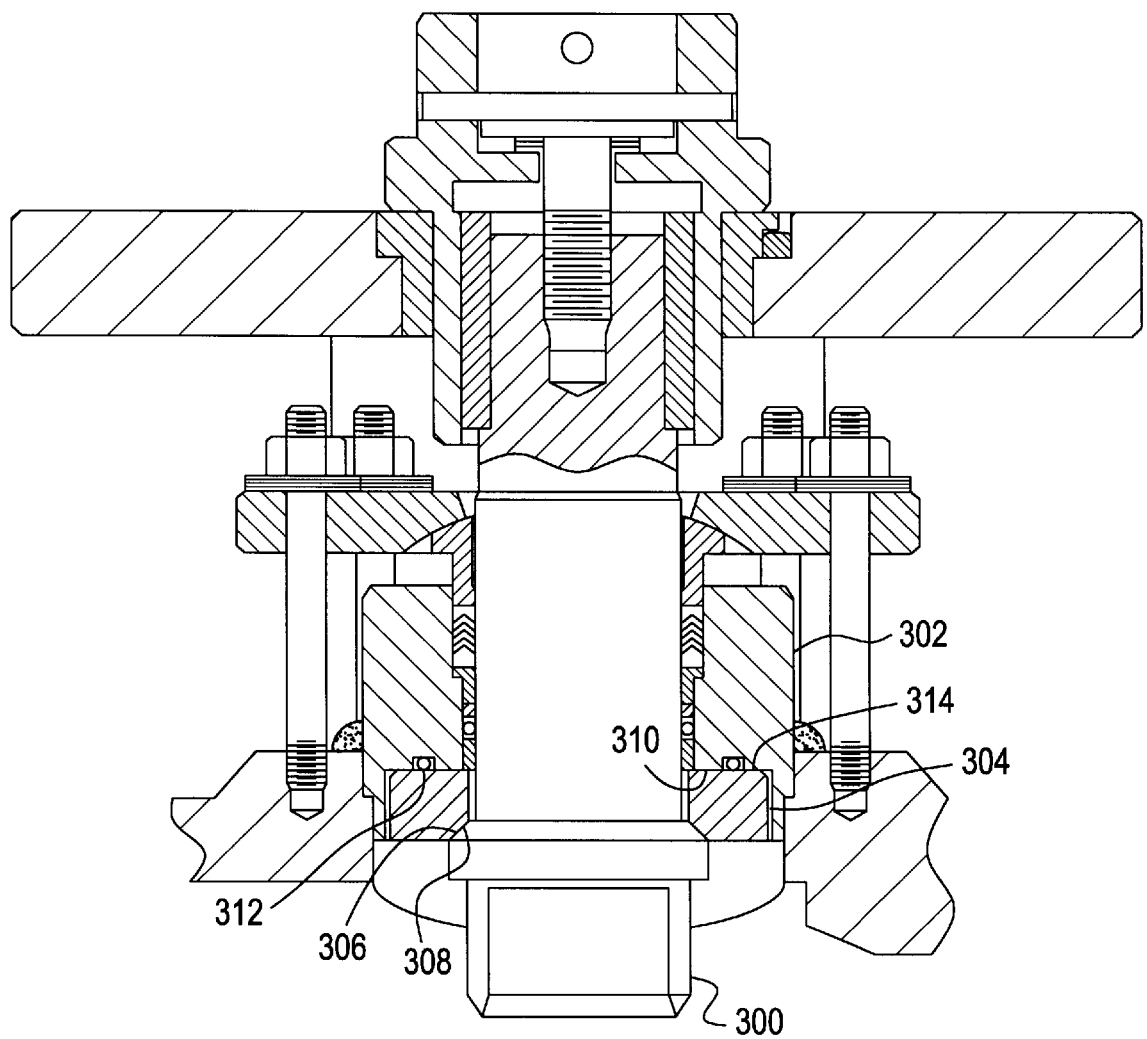
FIG. 6 is a partial sectional view of an alternate embodiment of the improved ball valve showing an alternative bonnet to stem seal.
Figure 7:
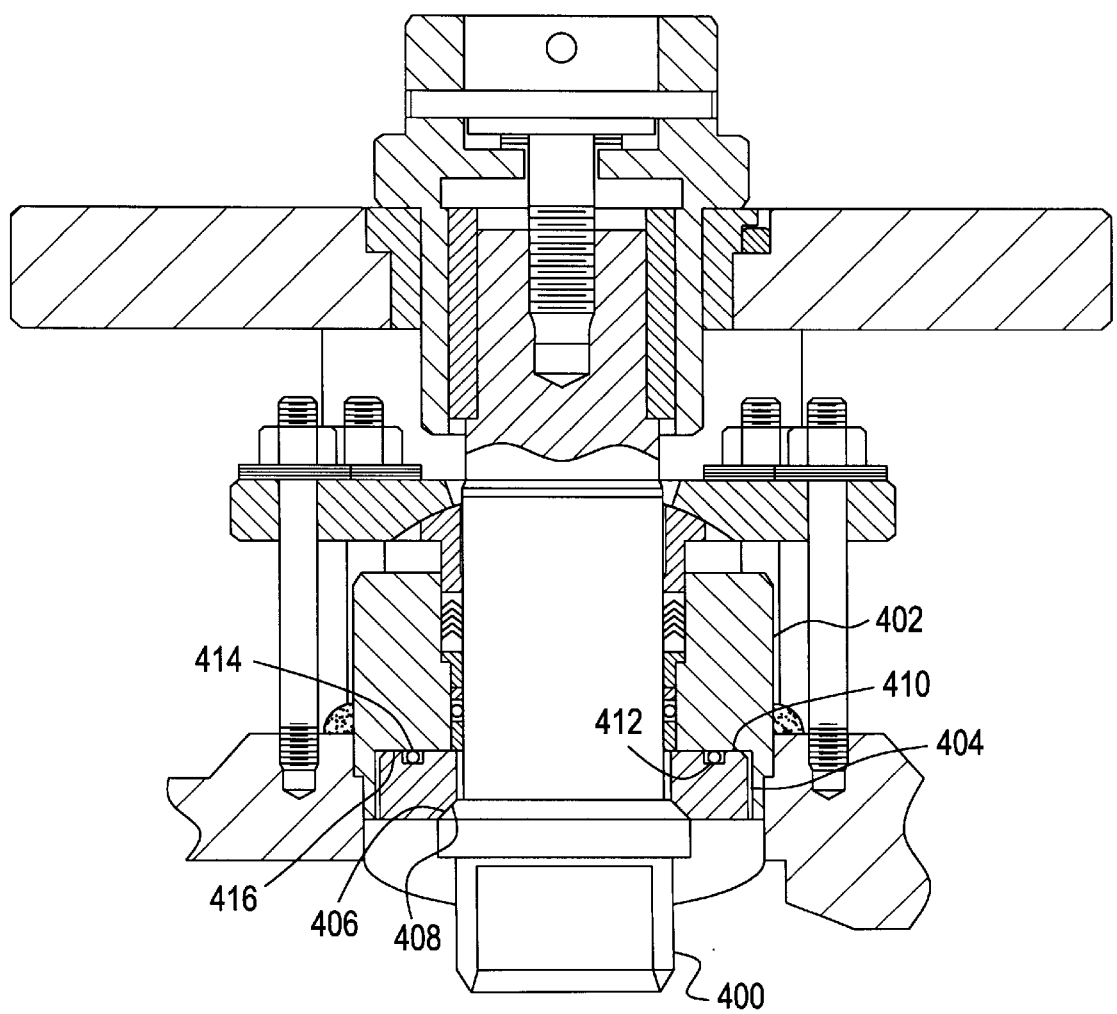
FIG. 7 is a partial sectional view of another alternate embodiment of the improved ball valve showing an alternative bonnet to stem seal.
Figure 8:
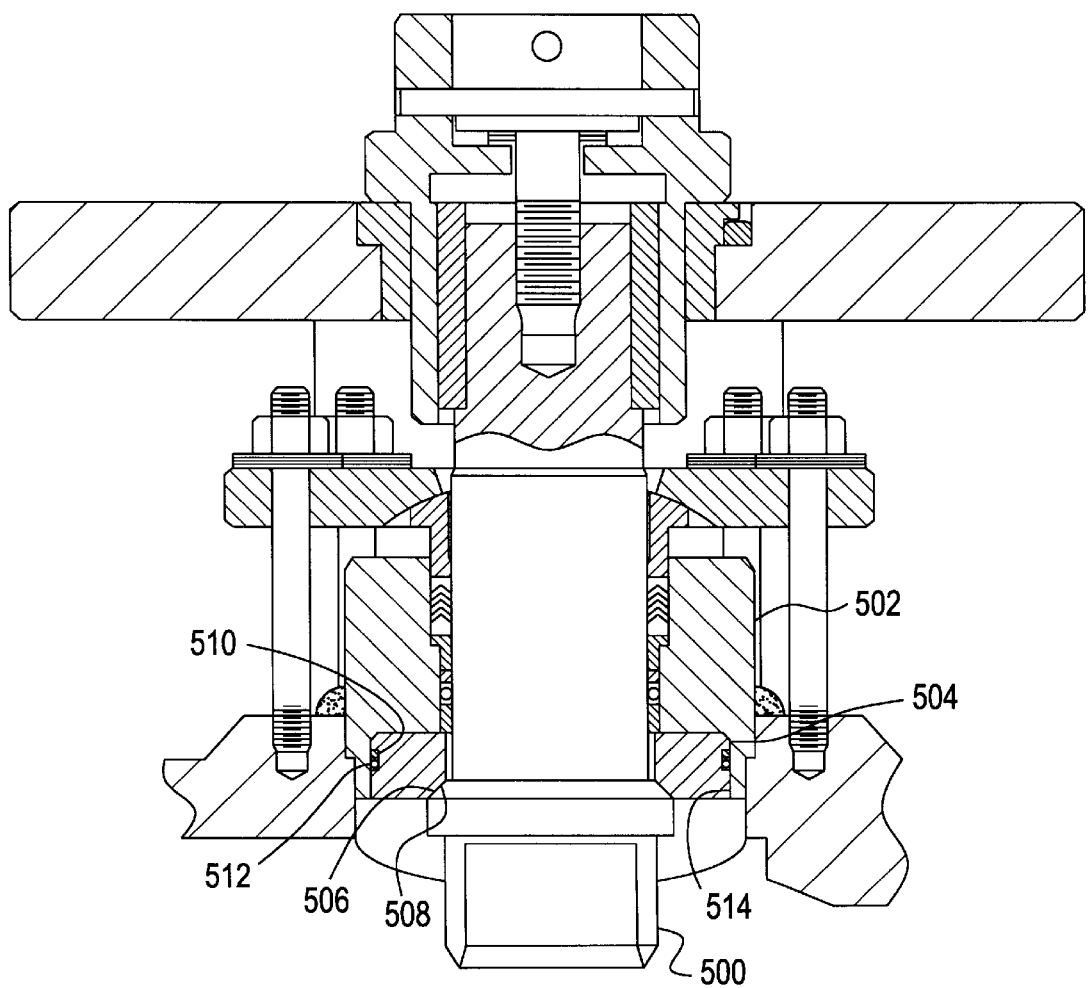
FIG. 8 is a partial sectional view of another alternate embodiment of the improved ball valve showing an alternative bonnet to stem seal.

Other embodiments showing different ways to effect a seal between the ceramic seal ring and bonnet body are shown in FIGS. 6–8. Those items that are identical to those in the preferred embodiment of FIGS. 2–4 retain their original numerical designation. In FIG. 6 stem 300 is positioned within bonnet 302 as in the preferred embodiment. Ceramic seal ring 304 seals the annular space between bonnet body 302 and stem 300. As in the preferred embodiment, "O" ring 170, backup rings 172 and chevron type packing 178 function as redundant seals to ensure any lethal gas or fluid contained within valve 100 cannot leak to the outside. Ceramic seal ring 304 seals against outwardly facing shoulder 306 on stem 300. Shoulder 306 of stem 300 may be spherically or frustoconically shaped as in the previous embodiments. Shoulder 306 is lapped to form a gas tight seal against mating shoulder 308 of ceramic seal ring 304 that also has a lapped finish. The sealing of the annulus between stem 300 and bonnet body 302 is completed by an "O" ring seal between bonnet body 302 and ceramic seal ring 304. Lower face 310 of bonnet body 302 is machined to accept "O" ring 312 that seals against upper face 314 of ceramic seal ring 304. Sufficient contact force between stem 300, bonnet body 302 and ceramic seal ring 304 to ensure a gas tight seal is maintained by loading bolt 164 and belleville springs 168 as in the preferred embodiment.

In FIG. 7 stem 400 is positioned within bonnet body 402 as in the preferred embodiment. Ceramic seal ring 404 seals the annular space between bonnet body 402 and stem 400. Ceramic seal ring 404 seals against outwardly facing shoulder 406 on stem 400. Shoulder 406 of stem 400 may be spherically or frustoconically shaped as in the previous embodiments. Shoulder 406 is lapped to form a gas tight seal against mating shoulder 408 of ceramic seal ring 404 that also has a lapped finish. The sealing of the annulus between stem 400 and bonnet body 402 is completed by an "O" ring seal located on ceramic seal ring 404. Upper face 410 of ceramic seal ring 404 has groove 412 formed therein to accept "O" ring 414 that seals against lower face 416 of bonnet body 402.

A final alternative embodiment is shown in FIG. 8 stem 500 is positioned within bonnet body 502 as in the preferred embodiment. Ceramic seal ring 504 seals the annular space between bonnet body 502 and stem 500. Ceramic seal ring 504 seals against outwardly facing shoulder 506 on stem 500. Shoulder 506 of stem 500 may be spherically or frustoconically shaped as in the previous embodiments. Shoulder 506 is lapped to form a gas tight seal against mating shoulder 508 of ceramic seal ring 504 that also has a lapped finish. The sealing of the annulus between stem 500 and bonnet body 502 is completed by an "O" ring seal located on the outer diameter of ceramic seal ring 504. Ceramic seal ring 504 has groove 510 formed thereon to accept "O" ring 512 that seals against recess 514 of bonnet body 502.

The construction of our improved ball valve for lethal gas or fluid service will be readily understood from the foregoing description and it will be seen that we have provided an improved valve to allow sealing toxic gases such as phosgene with a triple redundant sealing apparatus. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A bonnet assembly and actuation means for a ball valve used in lethal gas or fluid service, the ball valve having a body with a central bore, a ball controlling fluid communication through said central bore, a seat in sealing engagement with the body and the ball and an urging means maintaining the seat, ball and body in sealing engagement, said bonnet assembly and actuation means, comprising:

a bonnet sealingly connected to said body;

a stem engaging said ball and rotatable within said bonnet assembly to move said ball between open and closed positions;

a seal ring positioned between said stem and said bonnet, said seal ring having a first seal surface for sealing engagement with a corresponding seal surface on said stem and a second seal surface for sealing engagement with a corresponding seal surface on said bonnet;

a preloading means maintaining said seal surfaces on said bonnet, stem and seal ring in sealing engagement;

a triple redundant seal between said stem and said bonnet; and, a stem adapter positioned about said stem and keyed to said stem whereby rotation of said stem adapter causes rotation of said stem, a pair of mounting legs rigidly connected to said valve body, a mounting flange connected to said pair of mounting legs, said stem adapter rotatably mounted within said mounting flange, said rigidly connected mounting legs and said mounting flange isolating said stem from externally applied loads and thereby maintaining said seal ring positioned between said stem and said bonnet in sealing engagement.

2. A bonnet assembly and actuation means for a ball valve used in lethal gas or fluid service according to claim 1, wherein:

said seal ring first seal surface for sealing engagement with a corresponding seal surface on said stem is a frustoconical surface, said corresponding seal surface on said stem is a mating frustoconical surface, and, said seal ring positioned between said stem and bonnet is ceramic, polymeric, high alloy metal or high alloy metal with an abrasion resistant coating.

3. A bonnet assembly and actuation means for a ball valve used in lethal gas or fluid service according to claim 2, including:

a packing follower to maintain said redundant seal in sealing engagement with said stem and said bonnet;

an urging means for preloading said packing follower; and, said packing follower having a spherical upper surface to allow misalignment between said packing follower preloading means and said packing follower.

4. A bonnet assembly and actuation means for a ball valve used in lethal gas or fluid service according to claim 3, wherein said preloading means maintaining said seal surfaces on said bonnet, stem and seal ring in sealing engagement, includes:

a preloading bolt having a threaded lower portion and an upper flanged portion, said threaded lower portion of said preloading bolt threaded into said stem and said upper flanged portion of said preloading bolt engaging a recess in said stem adapter; and, a plurality of spring washers positioned between said upper flanged portion of said preloading bolt and said recess in said stem adapter whereby rotation of said preloading bolt compresses said spring washers and preloads said stem to maintain said seal ring seal between said stem and said bonnet.

5. A bonnet assembly and actuation means for a ball valve used in lethal gas or fluid service according to claim 1, wherein:

said seal ring first seal surface for sealing engagement with a corresponding seal surface on said stem is a spherical surface, said corresponding seal surface on said stem is a mating spherical surface, and said seal ring positioned between said stem and bonnet is ceramic, polymeric, high alloy metal or high alloy metal with an abrasion resistant coating.

6. A bonnet assembly and actuation means for a ball valve used in lethal gas or fluid service according to claim 5, including:

a packing follower to maintain said redundant seal in sealing engagement with said stem and said bonnet;

an urging means for preloading said packing follower; and, said packing follower having a spherical upper surface to allow misalignment between said packing follower preloading means and said packing follower.

7. A bonnet assembly and actuation means for a ball valve used in lethal gas or fluid service according to claim 6, further including:

a stem adapter positioned about said stem and keyed to said stem whereby rotation of said stem adapter causes rotation of said stem;

a pair of mounting legs rigidly connected to said valve body;

a mounting flange connected to said pair of mounting legs; and, said stem adapter rotatably mounted within said mounting flange.

8. A bonnet assembly and actuation means for a ball valve used in lethal gas or fluid service according to claim 7, wherein said preloading means maintaining said seal surfaces on said bonnet, stem and seal ring in sealing engagement, includes:

a preloading bolt having a threaded lower portion and an upper flanged portion, said threaded lower portion of said preloading bolt threaded into said stem and said upper flanged portion of said preloading bolt engaging a recess in said stem adapter; and, a plurality of spring washers positioned between said upper flanged portion of said preloading bolt and said recess in said stem adapter whereby rotation of said preloading bolt compresses said spring washers and preloads the stem to maintain the seal ring seal between said stem and said bonnet.

9. An improved ball valve for lethal gas or fluid service, comprising:

a body having an inlet connection and an outlet connection in fluid communication with a through bore;

a ball with a through bore positioned in said body through bore controlling fluid communication between said inlet connection and said outlet connection;

a seat adjacent said outlet port in sealing engagement with said body and said ball;

an urging means maintaining said seat, ball and body in sealing engagement;

a bonnet sealingly connected to said body;

a stem engaging said ball and rotatable within said bonnet assembly to move said ball between open and closed positions;

a seal ring positioned between said stem and said bonnet, said seal ring having a first seal surface for sealing engagement with a corresponding seal surface on said stem and a second seal surface for sealing engagement with a corresponding seal surface on said bonnet;

a preloading means maintaining said seal surfaces on said bonnet, stem and seal ring in sealing engagement; and, a triple redundant seal between said stem and said bonnet; and a stem adapter positioned about said stem and keyed to said stem whereby rotation of said stem adapter causes rotation of said stem, a pair of mounting legs rigidly connected to said valve body, a mounting flange connected to said pair of mounting legs, said stem adapter rotatably mounted within said mounting flange, said rigidly connected mounting legs and said mounting flange isolating said stem from eternally applied loads and thereby maintaining said seal ring positioned between said stem and said bonnet in sealing engagement.

10. An improved ball valve for lethal gas or fluid service according to claim 9, wherein:

said seal ring first seal surface for sealing engagement with a corresponding seal surface on said stem is a frustoconical surface, said corresponding seal surface on said stem is a mating frustoconical surface, and said seal ring positioned between said stem and bonnet is ceramic, polymeric, high alloy metal or high alloy metal with an abrasion resistant coating.

11. An improved ball valve for lethal gas or fluid service according to claim 10, including:

a packing follower to maintain said redundant seal in sealing engagement with said stem and said bonnet;

an urging means for preloading said packing follower; and, said packing follower having a spherical upper surface to allow misalignment between said packing follower preloading means and said packing follower.

12. An improved ball valve for lethal gas or fluid service according to claim 11, wherein said preloading means maintaining said sealing surfaces on said bonnet, stem and seal ring in sealing engagement, includes:

a preloading bolt having a threaded lower portion and an upper flanged portion, said threaded lower portion of said preloading bolt threaded into said stem and said upper flanged portion of said preloading bolt engaging a recess in said stem adapter; and, a plurality of spring washers positioned between said upper flanged portion of said preloading bolt and said recess in said stem adapter whereby rotation of said preloading bolt compresses said spring washers and preloads the stem to maintain the seal ring seal between said stern and said bonnet.

13. An improved ball valve for lethal gas or fluid service according to claim 9 wherein:

said seal ring first seal surface for sealing engagement with a corresponding seal surface on said stem is a spherical surface, said corresponding seal surface on said stem is a mating spherical surface, and said seal ring positioned between said stem and bonnet is ceramic, polymeric, high alloy metal or high alloy metal with an abrasion resistant coating.

14. An improved ball valve for lethal gas or fluid service according to claim 13, including:

a packing follower to maintain said redundant seal in sealing engagement with said stem and said bonnet;

an urging means for preloading said packing follower; and, said packing follower having a spherical upper surface to allow misalignment between said packing follower preloading means and said packing follower.

15. An improved ball valve for lethal gas or fluid service according to claim 14, further including:

a stem adapter positioned about said stem and keyed to said stem whereby rotation of said stem adapter causes rotation of said stem;

a pair of mounting legs rigidly connected to said valve body;

a mounting flange connected to said pair of mounting legs; and, said stem adapter rotatably mounted within said mounting flange.

16. An improved ball valve for lethal gas or fluid service according to claim 15, wherein said preloading means maintaining said sealing surfaces on said bonnet, stem and seal ring in sealing engagement, includes:

a preloading bolt having a threaded lower portion and an upper flanged portion, said threaded lower portion of said preloading bolt threaded into said stem and said upper flanged portion of said preloading bolt engaging a recess in said stem adapter; and, a plurality of spring washers positioned between said upper flanged portion of said preloading bolt and said recess in said stem adapter whereby rotation of said preloading bolt compresses said spring washers and preloads the stem to maintain the seal ring seal between said stem and said bonnet.

17. A bonnet assembly and actuation means for a ball valve used in lethal gas or fluid service, the ball valve having a body with a central bore, a ball controlling fluid communication through said central bore, a seat in sealing engagement with the body and the ball and an urging means maintaining the seat, ball and body in sealing engagement, said bonnet assembly and actuation means, comprising:

a bonnet sealingly connected to said body;

a stem engaging said ball and rotatable within said bonnet assembly to move said ball between open and closed positions;

a seal ring positioned between said stem and said bonnet, said seal ring having a first seal surface for sealing engagement with a corresponding seal surface on said stem;

a seal sealingly engaging a second seal surface on said seal ring and a corresponding seal surface on said bonnet;

a preloading means maintaining said seal surfaces on said bonnet, stem and seal ring in sealing engagements;

a triple redundant seal between said stem and said bonnet; and, a stem adapter positioned about said stem and keyed to said stem whereby rotation of said stem adapter causes rotation of said stem, a pair of mounting legs rigidly connected to said valve body, a mounting flange connected to said pair of mounting legs, said stem adapter rotatable mounted within said mounting flange, said rigidly connected mounting legs and said mounting flange isolating said stem from externally applied loads and thereby maintaining said seal ring positioned between said stem and said bonnet in sealing engagement.

18. A bonnet assembly and actuation means for a ball valve used in lethal gas or fluid service according to claim 17, wherein:
   said seal ring first seal surface for sealing engagement with a corresponding seal surface on said stem is a frustoconical surface;
   said corresponding seal surface on said stem is a mating frustoconical surface;
   said seal ring positioned between said stem and bonnet is ceramic, polymeric, high alloy metal or high alloy metal with an abrasion resistant coating; and,
   said seal for sealingly engaging a second seal surface on said seal ring and a corresponding seal surface on said bonnet is elastomeric or polymeric.

19. A bonnet assembly and actuation means for a ball valve used in lethal gas or fluid service according to claim 18, including:
   a packing follower to maintain said redundant seal in sealing engagement with said stem and said bonnet;
   an urging means for preloading said packing follower; and,
   said packing follower having a spherical upper surface to allow misalignment between said packing follower preloading means and said packing follower.

20. A bonnet assembly and actuation means for a ball valve used in lethal gas or fluid service according to claim 19, further including:
   a stem adapter positioned about said stem and keyed to said stem whereby rotation of said stem adapter causes rotation of said stem;
   a pair of mounting legs rigidly connected to said valve body;
   a mounting flange connected to said pair of mounting legs; and,
   said stem adapter rotatably mounted within said mounting flange.

21. A bonnet assembly and actuation means for a ball valve used in lethal gas or fluid service according to claim 19, wherein said preloading means maintaining said seal surfaces on said bonnet, stem and seal ring in sealing engagement, includes:
   a preloading bolt having a threaded lower portion and an upper flanged portion, said threaded lower portion of said preloading bolt threaded into said stem and said upper flanged portion of said preloading bolt engaging a recess in said stem adapter; and,
   a plurality of spring washers positioned between said upper flanged portion of said preloading bolt and said recess in said stem adapter whereby rotation of said preloading bolt compresses said spring washers and preloads said stem to maintain said seal ring seal between said stem and said bonnet.

22. A bonnet assembly and actuation means for a ball valve used in lethal gas or fluid service according to claim 17, wherein:
   said seal ring first seal surface for sealing engagement with a corresponding seal surface on said stem is a spherical surface;
   said corresponding seal surface on said stem is a mating spherical surface;
   said seal ring positioned between said stem and bonnet is ceramic, polymeric, high alloy metal or high alloy metal with an abrasion resistant coating; and,
   said seal for sealingly engaging a second seal surface on said seal ring and a corresponding seal surface on said bonnet is elastomeric or polymeric.

23. A bonnet assembly and actuation means for a ball valve used in lethal gas or fluid service according to claim 22, including:
   a packing follower to maintain said redundant seal in sealing engagement with said stem and said bonnet;
   an urging means for preloading said packing follower; and,
   said packing follower having a spherical upper surface to allow misalignment between said packing follower preloading means and said packing follower.

24. A bonnet assembly and actuation means for a ball valve used in lethal gas or fluid service according to claim 23, further including:
   a stem adapter positioned about said stem and keyed to said stem whereby rotation of said stem adapter causes rotation of said stem;
   a pair of mounting legs rigidly connected to said valve body;
   a mounting flange connected to said pair of mounting legs; and,
   said stem adapter rotatably mounted within said mounting flange.

25. A bonnet assembly and actuation means for a ball valve used in lethal gas or fluid service according to claim 24, wherein said preloading means maintaining said seal surfaces on said bonnet, stem and seal ring in sealing engagement, includes:
   a preloading bolt having a threaded lower portion and an upper flanged potion, said threaded lower portion of said preloading bolt threaded into said stem and said upper flanged portion of said preloading bolt engaging a recess in said stem adapter; and,
   a plurality of spring washers positioned between said upper flanged portion of said preloading bolt and said recess in said stem adapter whereby rotation of said preloading bolt compresses said spring washers and preloads the stem to maintain the seal ring seal between said stem and said bonnet.

26. An improved ball valve for lethal gas or fluid service, comprising:
   a body having an inlet connection and an outlet connection in fluid communication with a through bore;
   a ball with a through bore positioned in said body through bore controlling fluid communication between said inlet connection and said outlet connection;
   a seat adjacent said outlet port in sealing engagement with said body and said ball;
   an urging means maintaining said seat, ball and body in sealing engagement;
   a bonnet sealingly connected to said body;
   a stem engaging said ball and rotatable within said bonnet assembly to move said ball between open and closed positions;
   a seal ring positioned between said stem and said bonnet, said seal ring having a first seal surface for sealing engagement with a corresponding seal surface on said stem;

a seal sealingly engaging a second seal surface on said seal ring and a corresponding seal surface on said bonnet;

a preloading means maintaining said seal surfaces on said bonnet, stem and seal ring in sealing engagement;

a triple redundant seal between said stem and said bonnet; and a stem adapter positioned about said stem and keyed to said stem whereby rotation of said stem adapter causes rotation of said stem, a pair of mounting legs rigidly connected to said valve body, a mounting flange connected to said pair of mounting legs, said stem adapter rotatably mounted within said mounting flange, said rigidly connected mounting legs and said mounting flange isolating said stem from externally applied loads and thereby maintaining said seal ring positioned between said stem and said bonnet in sealing engagement.

27. An improved ball valve for lethal gas or fluid service according to claim 26, wherein:

said seal ring first seal surface for sealing engagement with a corresponding seal surface on said stem is a frustoconical surface;

said corresponding seal surface on said stem is a mating frustoconical surface;

said seal ring positioned between said stem and bonnet is ceramic, polymeric, high alloy metal or high alloy metal with an abrasion resistant coating; and, said seal for sealingly engaging a second seal surface on said seal ring and a corresponding seal surface on said bonnet is elastomeric or polymeric.

28. An improved ball valve for lethal gas or fluid service according to claim 27, including:

a packing follower to maintain said redundant seal in sealing engagement with said stem and said bonnet;

an urging means for preloading said packing follower; and, said packing follower having a spherical upper surface to allow misalignment between said packing follower preloading means and said packing follower.

29. An improved ball valve for lethal gas or fluid service according to claim 28, wherein said preloading means maintaining said seal surfaces on said bonnet, stem and seal ring in sealing engagement, includes:

a preloading bolt having a threaded lower portion and an upper flanged portion, said threaded lower portion of said preloading bolt threaded into said stem and said upper flanged portion of said preloading bolt engaging a recess in said stem adapter; and, a plurality of spring washers positioned between said upper flanged portion of said preloading bolt and said recess in said stem adapter whereby rotation of said preloading bolt compresses said spring washers and preloads the stem to maintain the seal ring seal between said stem and said bonnet.

30. An improved ball valve for lethal gas or fluid service according to claim 26, wherein:

said seal ring first seal surface for sealing engagement with a corresponding seal surface on said stem is a spherical surface;

said corresponding seal surface on said stem is a mating spherical surface;

said seal ring positioned between said stem and bonnet is ceramic, polymeric, high alloy metal or high alloy metal with an abrasion resistant coating; and, said seal for sealingly engaging a second seal surface on said seal ring and a corresponding seal surface on said bonnet is elastomeric or polymeric.

31. An improved ball valve for lethal gas or fluid service according to claim 30, including:

a packing follower to maintain said redundant seal in sealing engagement with said stem and said bonnet;

an urging means for preloading said packing follower; and, said packing follower having a spherical upper surface to allow misalignment between said packing follower preloading means and said packing follower.

32. An improved ball valve for lethal gas or fluid service according to claim 31, further including:

a stem adapter positioned about said stem and keyed to said stem whereby rotation of said stem adapter causes rotation of said stem;

a pair of mounting legs rigidly connected to said valve body;

a mounting flange connected to said pair of mounting legs; and, said stem adapter rotatably mounted within said mounting flange.

33. An improved ball valve for lethal gas or fluid service according to claim 32, wherein said preloading means maintaining said seal surfaces on said bonnet, stem and seal ring in sealing engagement, includes:

a preloading bolt having a threaded lower portion and an upper flanged portion, said threaded lower portion of said preloading bolt threaded into said stem and said upper flanged portion of said preloading bolt engaging a recess in said stem adapter; and, a plurality of spring washers positioned between said upper flanged portion of said preloading bolt and said recess in said stem adapter whereby rotation of said preloading bolt compresses said spring washers and preloads the stem to maintain the seal ring seal between said stem and said bonnet.

* * * * *